Oct. 23, 1962  E. SUAY  3,059,594
AUTOMATIC MACHINE FOR THE MANUFACTURE OF PIES
Filed Aug. 15, 1960

INVENTOR
ENRIQUE SUAY ns patent office 3,059,594
Patented Oct. 23, 1962

3,059,594
AUTOMATIC MACHINE FOR THE MANUFACTURE OF PIES
Enrique Suay, Calle Duque de Calabria 19,
Valencia, Spain
Filed Aug. 15, 1960, Ser. No. 49,610
2 Claims. (Cl. 107—1)

The present invention relates to an automatic machine for the continuous manufacture of pies and the like.

Some machines for the continuous manufacture of pies are already on the market. However, all of these are hand-operated, both for feeding the dough and for shaping the pie or cake. In all cases it is required to roll the dough and to shape the same in compliance with a great variety of requirements.

The production of known machines or devices is limited, as the dough is prepared independently of the filling and a manual feeding of the dough to the machine is necessary.

The machine of the invention, however, effects all the necessary operations automatically, from rolling the dough to shaping the pie and the final trimming of the surplus dough.

Accordingly, the principal object of the invention is satisfied in that a fully automatic operation is provided wherein dough is formed into final desired shapes of pies.

To this effect, a set of three rollers is utilized, of which one is the driver and the other two are driven thereby. The first two of the rollers sequentially constitute dough feeders and are adapted for being fed with dough from a hopper mounted between the same. The driver roller or first roller can be spaced from the second or other of the dough feeder rollers by an adjustable distance to control the thickness of the roller dough.

The other of the driven rollers is a third roller and is of a greater diameter than that of the second roller and is provided with a cavity or recess of a shape identical to that of the pie to be obtained, this recess being provided with cutting edges to separate the surplus dough. The movement of the second and third rollers is synchronized by means of a mechanical system which produces a reciprocal movement of the third roller, while the second roller rotates with a continuous movement. This reciprocal motion during the rotation of the third roller, produces a doubling of the dough, as required for shaping the pie or cake.

Figure 1:
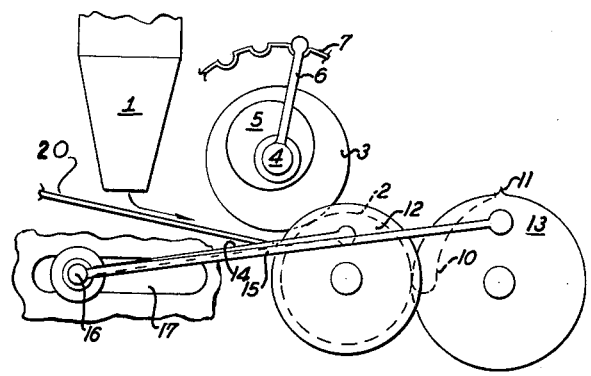
Figure 2:
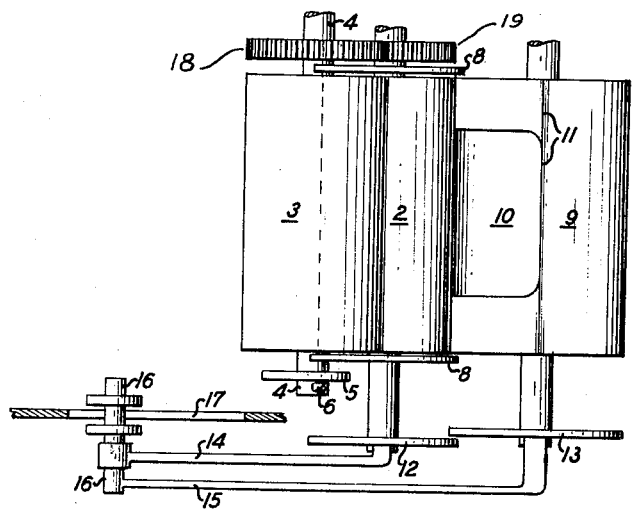

All characteristics of a machine representing a preferred embodiment of the invention are illustrated in the accompanying drawing, wherein:

FIG. 1 is a side elevational view, and
FIG. 2 is a top view of said machine.

The hopper 1 receives the dough and ultimately discharges it between the feeding and spreading rollers 2 and 3. The hopper is adapted for discharging the dough onto a feedway 20 which leads to the rollers 2, 3. The rollers draw the dough therebetween by the rotation of the rollers. The feed roller 2 has a stationary axis, whereas the spreading roller 3 is movable and is driven from its shaft by means of a motor or crank. Its shaft 4 is connected with an eccentric 5 and to a lever 6, which by sliding upon a toothed segment 7 adjusts the position of roller 3 with respect to roller 2, thus determining the thickness of the dough that is rolled therebetween. Both rollers are in direct driving engagement through gears 18, 19 so as to rotate in opposite directions.

The periphery of roller 2 is provided with flanges 8, to prevent the dough from overflowing the surface of the rollers.

The surface of the third roller 9 is provided with a cavity or recess 10 identical in shape to that of the pie to be obtained. The extension of this recess is limited by a knife edge 11 to cut the surplus dough.

The movement of the rollers 2 and 9 is synchronized and is transmitted from the one to the other by means of a set of eccentrics and connecting rods. The eccentrics 12 and 13, corresponding respectively to each of these rollers, are interconnected by means of connecting rods 14 and 15 to a common shaft 16, which is displaceable along a slider 17. As will be noted the eccentric 12 has a slightly shorter stroke than the eccentric 13. Thus, when the eccentric 12 completes a turn, the eccentric 13 has not yet reached the end of its turn, and therefore is turned in the opposite direction during the second turn of the first eccentric, thereby causing a reciprocal movement of the roller 9.

The dough in the hopper 1 is discharged in feedway 20 and passed between the rollers 2 and 3, which cause the dough to be advanced while simultaneously spreading it out. The dough drawn by the rollers advances along roller 2 until it reaches the knife 11, constituting the upper edge of the recess or cavity of roller 9. Roller 9 then carries the dough in a rotary movement as determined by eccentric 13 such that upon reaching its limit positions as defined by slider 17, the roller 9 is reversed in direction. Thereby a doubling of the dough in the recess is effected and by means of an automatic dosing device a filling is placed inside of the doubled dough. The folded-up dough is closed around the recess and trimmed by the edges thereof, when the recess passes tangentially over the roller 2, and moves towards the lower part of the machine, whereat the finished pie leaves the described device.

During the stroke, that is to say when the recess is again raised, the edge of the cut-out dough bears upon the same and a new working cycle is initiated for the production of another pie or cake.

It is to be appreciated that roller 3 and roller 2 are driven together through gears 18, 19, while eccentric 12, coupled to roller 2, causes reciprocatory movement of shaft 16. Eccentric 12 which is coupled to shaft 16 and roller 9 causes rotary movement of the roller 9. By virtue of the difference in strokes between eccentrics 12 and 13 roller 9 is caused to alternatingly rotate in opposite directions.

The advantages to be obtained by this new machine are innumerable, the following being those most important:

(a) Continuous production
(b) Reduction of manipulation costs
(c) Automatic production and consequent perfect asepsis.

The preceding description having been made, it should be added that details of realization of the disclosed idea can vary without in any way changing the essence of the invention, which is defined in the appended claims.

What is claimed is:

1. Apparatus for manufacturing pies comprising driven rollers constituting spreading and feeding rollers, a driver roller operatively associated with said driven rollers and defining a recess adapted to receive dough from said driven rollers, means to space said driven rollers controllably, and means coupled between said driver and driven rollers such that a rotation of one of said driven rollers is concomitant with a reciprocal movement of said driver roller whereby a folding of the dough in said recess results.

2. Apparatus as claimed in claim 1 wherein the second said means is a mechanical system including eccentrics and connecting rods.

References Cited in the file of this patent

UNITED STATES PATENTS

| | | |
|---|---|---|
| 1,007,732 | Raskin et al. | Nov. 7, 1911 |
| 2,323,907 | Harriss et al. | July 13, 1943 |
| 2,566,628 | Patt | Sept. 4, 1951 |
| 2,719,493 | Brooks | Oct. 4, 1955 |